(12) United States Patent
Fedorova et al.

(10) Patent No.: US 9,447,523 B2
(45) Date of Patent: Sep. 20, 2016

(54) MELT BLOWN FIBER FORMING PROCESS AND METHOD OF MAKING FIBROUS STRUCTURES

(71) Applicant: 3M INNOVATIVE PROPERTIES COMPANY, St. Paul, MN (US)

(72) Inventors: Nataliya V. Fedorova, Woodbury, MN (US); Eric M. Moore, Roseville, MN (US); Sehyun Nam, Woodbury, MN (US); Pamela A. Percha, Woodbury, MN (US); Sachin Talwar, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/366,446

(22) PCT Filed: Dec. 20, 2012

(86) PCT No.: PCT/US2012/070764
§ 371 (c)(1),
(2) Date: Jun. 18, 2014

(87) PCT Pub. No.: WO2013/096529
PCT Pub. Date: Jun. 27, 2013

(65) Prior Publication Data
US 2015/0125696 A1 May 7, 2015

Related U.S. Application Data

(60) Provisional application No. 61/579,008, filed on Dec. 22, 2011.

(51) Int. Cl.
| | | |
|---|---|---|
| *C07F 9/30* | (2006.01) | |
| *C09K 21/04* | (2006.01) | |
| *C09K 21/12* | (2006.01) | |
| *D01D 1/04* | (2006.01) | |
| *D01D 5/08* | (2006.01) | |
| *D01D 5/084* | (2006.01) | |
| *D01D 10/02* | (2006.01) | |
| *D01D 10/06* | (2006.01) | |
| *D01F 1/02* | (2006.01) | |
| *D01F 1/07* | (2006.01) | |
| *D01F 6/62* | (2006.01) | |
| *D04H 3/16* | (2006.01) | |
| *D01D 5/098* | (2006.01) | |
| *D01F 1/10* | (2006.01) | |
| *C08G 63/88* | (2006.01) | |
| *D04H 3/011* | (2012.01) | |
| *C08K 5/5313* | (2006.01) | |

(52) U.S. Cl.
CPC ............... *D01F 6/62* (2013.01); *C08G 63/88* (2013.01); *C08K 5/5313* (2013.01); *D01D 5/0985* (2013.01); *D01F 1/10* (2013.01); *D04H 3/011* (2013.01); *D04H 3/16* (2013.01); *D10B 2331/04* (2013.01); *Y10T 428/298* (2015.01)

(58) Field of Classification Search
CPC ....... C07F 9/30; C08K 5/5313; C09K 21/04; C09K 21/12; D01D 1/04; D01D 5/08; D01D 5/084; D01D 5/0985; D01D 10/02; D01D 10/06; D01F 1/02; D01F 1/07; D01F 1/10; D01F 6/62; D04H 3/011; D10B 2331/04
USPC ........... 264/103, 211, 211.17, 233, 234, 555; 252/609; 524/133, 414
See application file for complete search history.

(56) References Cited

U.S. PATENT DOCUMENTS

| | | |
|---|---|---|
| 3,471,455 A | 10/1969 | Binsbergen |
| 3,971,373 A | 7/1976 | Braun |
| 4,118,531 A | 10/1978 | Hauser |
| 4,180,495 A | 12/1979 | Sandler |
| 4,208,321 A | 6/1980 | Sandler |
| 4,208,322 A | 6/1980 | Sandler |
| 4,429,001 A | 1/1984 | Kolpin |
| 4,755,178 A | 7/1988 | Insley |
| 5,658,662 A | 8/1997 | Leumer |

(Continued)

FOREIGN PATENT DOCUMENTS

| | | |
|---|---|---|
| CN | 1118819 | 3/1996 |
| CN | 1537984 | 10/2004 |

(Continued)

OTHER PUBLICATIONS

Aharoni, "Nucleation of PET Crystallization by Metal Hydroxides," Journal of Applied Polymer Science, 1984, vol. 29, pp. 853-865.
Cheng, "The Crystallization Kinetics of Filled Poly(ethylene terephthalate)," Journal of Applied Polymer Science, Mar. 1993, vol. 47, No. 12, pp. 2149-2160.

(Continued)

*Primary Examiner* — Leo B Tentoni

(57) ABSTRACT

A melt blowing process comprising: (a) providing a thermoplastic polymer material that includes at least one or a plurality of polyester polymers and at least one or a combination of different meltable metal phosphinates; and (b) melt blowing the thermoplastic polymer material into at least one fiber or a plurality of fibers, with each fiber having a diameter or thickness that is less than about 10 microns. The metal phosphinate is in an amount that (a) reduces the viscosity of the polyester polymer and (b) functions as a crystallizing agent, which at least promotes crystallization of the polyester polymer, when the thermoplastic polymer material is melt blown into the at least one fiber. Non-woven and woven fibrous structures can be made using fibers made from this process.

17 Claims, 3 Drawing Sheets

(56) References Cited

U.S. PATENT DOCUMENTS

| | | | |
|---|---|---|---|
| 5,753,736 A | 5/1998 | Bhat | |
| 5,780,534 A | 7/1998 | Kleiner | |
| 5,958,322 A | 9/1999 | Thompson | |
| 6,255,371 B1 | 7/2001 | Schlosser | |
| 6,309,987 B1 | 10/2001 | Srinivasan | |
| 6,365,071 B1 | 4/2002 | Jenewein | |
| 6,547,992 B1 | 4/2003 | Schlosser | |
| 6,632,385 B2* | 10/2003 | Kauschke et al. | 264/103 |
| 6,780,905 B2 | 8/2004 | Bienmuller | |
| 2001/0027226 A1 | 10/2001 | Thewes | |
| 2001/0036982 A1 | 11/2001 | Staniek | |
| 2002/0123286 A1 | 9/2002 | Principe | |
| 2003/0114070 A1 | 6/2003 | Raponi | |
| 2003/0193045 A1 | 10/2003 | Takeuchi | |
| 2004/0170837 A1 | 9/2004 | Benson | |
| 2004/0176506 A1 | 9/2004 | Sicken | |
| 2005/0101205 A1 | 5/2005 | Yasuda | |
| 2005/0137300 A1 | 6/2005 | Schlosser | |
| 2005/0272839 A1 | 12/2005 | Bauer | |
| 2006/0084734 A1 | 4/2006 | Bauer | |
| 2007/0173572 A1 | 7/2007 | Mediratta | |
| 2007/0275242 A1* | 11/2007 | Gopal et al. | 428/401 |
| 2008/0073629 A1 | 3/2008 | Chen | |
| 2008/0132620 A1* | 6/2008 | Chuah et al. | 524/133 |
| 2008/0139711 A1 | 6/2008 | Borade | |
| 2009/0036578 A1 | 2/2009 | Elango | |
| 2009/0043021 A1 | 2/2009 | Chang | |
| 2009/0137707 A1 | 5/2009 | Bauer | |
| 2009/0176091 A1 | 7/2009 | Karayianni | |
| 2010/0305224 A1 | 12/2010 | Li | |
| 2012/0189793 A1 | 7/2012 | Tsuneizumi | |
| 2014/0001672 A1 | 1/2014 | Tsuneizumi | |

FOREIGN PATENT DOCUMENTS

| | | | | |
|---|---|---|---|---|
| CN | 101265611 | | 9/2008 | |
| CN | 101285246 | | 10/2008 | |
| CN | 101358431 | | 2/2009 | |
| CN | 101423625 | | 5/2009 | |
| CN | 101845201 | | 9/2010 | |
| EP | 0792911 | | 9/1997 | |
| JP | 03-167312 | | 7/1991 | |
| JP | 04348166 A | * | 12/1992 | 524/494 |
| JP | 10-60246 | | 3/1998 | |
| JP | 11-106619 | | 4/1999 | |
| JP | 2002-220782 | | 8/2002 | |
| JP | 2003-147682 | | 5/2003 | |
| JP | 2003-247146 | | 9/2003 | |
| JP | 2003-247167 | | 9/2003 | |
| JP | 2004-107860 | | 4/2004 | |
| JP | 2004-174870 | | 6/2004 | |
| JP | 2004-353139 | | 12/2004 | |
| JP | 2006-063473 | | 3/2006 | |
| JP | 2009-029889 | | 2/2009 | |
| JP | 2011-137278 | | 7/2011 | |
| WO | WO 03-071014 | | 8/2003 | |
| WO | WO 2006-121160 | | 11/2006 | |
| WO | WO 2006-130212 | | 12/2006 | |
| WO | WO 2008-061075 | | 5/2008 | |
| WO | WO 2008-061087 | | 5/2008 | |
| WO | WO 2008-075916 | | 6/2008 | |
| WO | WO 2009-020945 | | 2/2009 | |
| WO | WO-2009045877 A1 | * | 4/2009 | |
| WO | WO 2009-079499 | | 6/2009 | |
| WO | WO 2011-106205 | | 9/2011 | |

OTHER PUBLICATIONS

Clariant Exolit Overview, Nov. 2006, 8 pages.
Dahiya, Melt Blown Technology, Apr. 2004, URL <http://web.utk.edul- msel Textiles/Melt%20Blown%20Technology.htm>, 14 pages. XP055060645.
Deo, "Eco-friendly Flame Retardant (FR) Pet Fibers Through P—N Synergism," Journal of Engineered Fibers and Fabrics, 2008, vol. 3, No. 4, pp. 23-38.
Destio, "Recent Advances in Flame Retardancy of Polymeric Materials," Proceedings of the second Conference on Recent Advances in Flame Retardancy of Polymeric Materials: Materials, Applications, Industry Developments, and Markets held in Stamford Connecticut, May 14, 15, 16, 1991, pp. 185-190.
Garcia, "Heterogeneous Nucleation of Polyethylene Terephthalate (PET)," Polymer Preprints, Apr. 1984, vol. 25, No. 1, pp. 197.
Groeninckx, "Crystallization of Poly (ethylene Terephthalate) Induced by Inorganic Compounds. Crystallization Behavior from the Glassy State in a Low-Temperature Region," Journal of Polymer Science, Mar. 11, 2003, vol. 12, No. 2, pp. 303-316.
Gupta, "Spinning Speed-Throughput Rate Relationships for Polyester, Nylon, and Polypropylene Fibers," Journal of Applied Polymer Science, 1997, vol. 65, No. 9, pp. 1773-1788.
Huo, "Improvements on Flame Retardant Properties of PET/Montmorillonite Nanocomposite Caused by Polyborosiloxane," Mater. Res. Soc. Symp. Proc., 2007, vol. 1007-S12-33, 8 pages.
Kim, "Crystallization Kinetics of Poly(Ethylene-Terephthalate): Memory Effect of Shear History," Polymer Engineering and Science, Jan. 1993, vol. 33, No. 2, pp. 83-91.
Legras, "Chemical nucleation, a new concept applied to the mechanism of action of organic acid salts on the crystallization of polyethylene terephthalate and bisphenol-A polycarbonate," Polymer, Jun. 1984, vol. 25, No. 6, pp. 835-844.
Narayanan, "Dimensional Stability of Melt Blown Polyester Nonwovens," TAPPI Proceeding: Nonwovens Conference & Trade Fair, Mar. 9-11, 1998, pp. 29-36.
Reinsch, "Crystallization Processes in Poly(Ethylene Terephthalate) as Modified by Polymer Additives and Fiber Reinforcement," Journal of Applied Polymer Science, 1994, vol. 52, pp. 649-662.
Reti, "Intumescent Biobased-Polylactide Films to Flame Retard Nonwovens," Journal of Engineered Fibers and Fabrics, 2009, vol. 4, No. 2, pp. 33-39.
Saujanya, "Structure development crystallization behavior of PP/nanoparticulate composite," Polymer, 2001, vol. 42, pp. 6723-6731.
Wente, "Manufacture of Superfine Organic Fibers," Report No. 4364 of the Naval Research Laboratories, May 25, 1954, 22 pages.
Wente, "Superfine Thermoplastic Fibers," Industrial Engineering Chemistry, 1956, vol. 48, pp. 1342-1346.
Xanthos, "Polypropylene/Polyethylene Terephthalate Blends Compatibilized Through Functionalization," Polymer Engineering and Science, Mar. 1990, vol. 30, No. 6, pp. 355-365.
Zhao, "Properties of PP/PET bicomponent melt blown microfiber nonwovens after heat-treatment," Polymer International, 2003, vol. 52, pp. 133-137.
Zaikov, "Ecological Issues of Polymer Flame Retardants," Handbook of plastic films, 159-183 (2003).
Zhang, "A review of flame retardant polypropylene fibres," Progress in Polymer Science, 2003, vol. 28, pp. 1517-1538.
Ziabicki, High Speed Fiber Spinning Science and Engineering Aspects, 383-483 (1985).
International Search Report for PCT International Application No. PCT/US2012/070764 mailed on May 13, 2013, 5 pages.

* cited by examiner

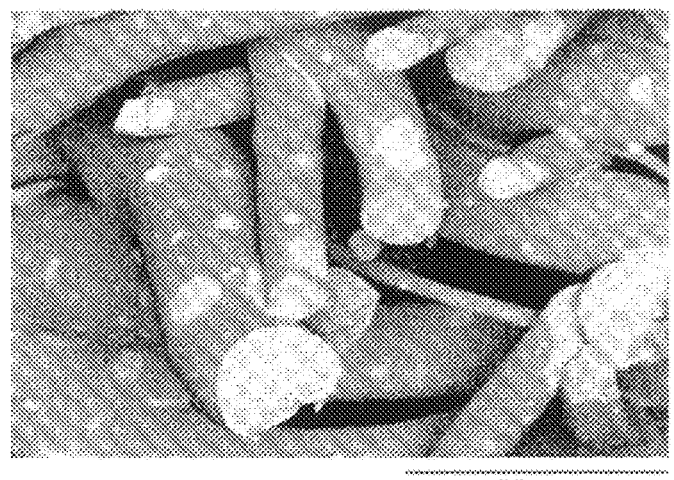
Fig. 1c
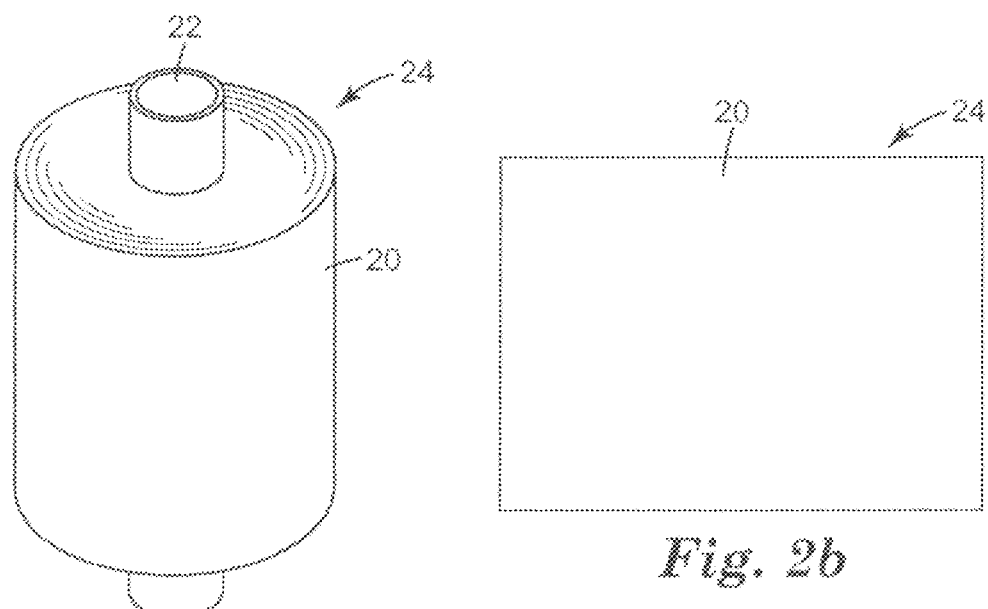
Fig. 2a
Fig. 2b

MELT BLOWN FIBER FORMING PROCESS AND METHOD OF MAKING FIBROUS STRUCTURES

CROSS REFERENCE TO RELATED APPLICATIONS

This application is a national stage filing under 35 U.S.C. 371 of PCT/US2012/070764, filed Dec. 20, 2012, which claims priority to U.S. Provisional Application No. 61/579,008, filed Dec. 22, 2011, the disclosures of which are incorporated by reference in their entireties herein.

FIELD OF THE INVENTION

The present invention relates to processes for melt blowing polymer fibers, in particular to processes for melt blowing fibers comprising a polyester polymer, and more particularly to melt blowing such fibers having a diameter or thickness that is less than about 10 microns. The present invention also relates to such melt blown polymer fibers and fibrous structures made therefrom that exhibit low shrinkage, as well as polymer compositions that are melt blowable into such fibers.

BACKGROUND

Melt blowing is an extrusion technology that produces fine fiber webs directly from a polymer. In melt blowing, thermoplastic polymer streams are extruded through a die containing closely arranged small orifices and attenuated by two convergent streams of high-velocity hot air into fine fibers. These fine fibers can be used to form a melt blown web often referred as a blown micro-fiber web. Blown micro-fiber webs are used in a variety of applications including acoustic and thermal insulation, filtration, barrier webs and wipes among many others. The primary resin used in blown micro-fiber processes is polypropylene (PP).

The present invention is an improvement over prior techniques for melt blowing polymer fibers, as well as melt blown fibers and fiber webs.

SUMMARY OF THE INVENTION

Before the present invention, it was difficult to melt blow thermoplastic polymer fibers comprising a polyester polymer, especially such fibers having a diameter or thickness of less than about 10 microns. To melt blow such fibers, the corresponding thermoplastic polyester polymer has to be heated to temperatures much higher than its melting point. Such elevated heating of the thermoplastic polyester polymer can result in one or any combination of problems that can include, for example, excessive degradation of the polymer, weak and brittle fiber webs, and formation of sand during meltblowing. Even when melt blown polyester polymer fibers are produced using convention processes, fibrous webs and other fibrous structures made with such fibers typically exhibit excessive shrinkage or otherwise poor dimensional stability at temperatures equal to or above the glass transition temperature of the polyester polymer used to make the fibers.

The present inventors have discovered a way to melt blow fibers using a thermoplastic polymer comprising at least one polyester polymer or a plurality of polyester polymers, where the fibers can be suitable for use at temperatures equal to or above the glass transition temperature of the polyester polymer used to make the fibers, even when the diameter of the fibers is less than about 10 microns. Such fibers may exhibit one or more desirable properties including, for example, one or any combination of: relatively low cost (e.g., manufacturing and/or raw material costs), durability, reduced shrinkage from heat exposure, increased dimensional stability at elevated temperature, and flame retardant properties. The present invention can also be used to provide environmentally friendlier non-halogenated flame retardant polyester based nonwoven or woven fibrous materials.

The present invention includes a process for making dimensionally stable melt blown micro-fibrous structures (e.g., mats, webs, sheets, scrims, fabric, etc.) with fibers comprising, consisting essentially of, or consisting of one or a combination of polyester polymers. Because they are made with polyester containing polymer materials that are dimensionally stable at elevated temperatures, non-woven and woven fibrous structures (e.g., mats, webs, sheets, scrims, fabric, etc.) made with such fibers, and articles (e.g., thermal and acoustic insulation and insulating articles, liquid and gas filters, garments, and personal protection equipment) made from such fibrous structures, can be used in relatively high temperature environments while exhibiting only minor, if any, amounts of shrinkage. The development of dimensionally stable polyester blown micro-fiber webs, which will not shrink significantly upon exposure to heat, will widen the applicability of these webs. By being made to exhibit sufficient flame retardant properties and/or durability, in addition to shrink resistance, such melt blown micro-fiber webs can become particularly useful as thermal and acoustical insulation.

In accordance with one aspect of the present invention, a process is provided that comprises: (a) providing a thermoplastic polymer material comprising at least one or a plurality of polyester polymers and at least one or a combination of different meltable metal phosphinates; (b) melt blowing the thermoplastic polymer material into at least one fiber or a plurality of fibers; and (c) heating the at least one fiber to a temperature equal to or above the glass transition temperature ($T_g$) of the polyester polymer. The metal phosphinate is in an amount that accelerates, induces or at least promotes crystallization of the polyester polymer, when the thermoplastic polymer material is melt blown into the at least one fiber. The polyester polymer of the at least one fiber is at least partially crystalline.

In accordance with an additional aspect of the present invention, a process is provided that comprises: (a) providing a thermoplastic polymer material that includes at least one or a plurality of polyester polymers and at least one or a combination of different meltable metal phosphinates; and (b) melt blowing the thermoplastic polymer material into at least one fiber or a plurality of fibers, with each fiber having a diameter or thickness that is less than about 10 microns. The metal phosphinate is in an amount that (a) reduces the viscosity of the polyester polymer and (b) functions as a crystallizing agent, which accelerates, induces or at least promotes crystallization of the polyester polymer, when the thermoplastic polymer material is melt blown into the at least one fiber. The polyester polymer of the at least one fiber is at least partially crystalline.

In another aspect of the present invention, a method of making a non-woven or woven fibrous structure (e.g., a mat, sheet, scrim, web, fabric, etc.) is provided, where the method comprises making fibers using the melt blowing process according to the present invention and forming the fibers into a non-woven or woven fibrous structure.

In an additional aspect of the present invention, at least one or more melt blown fibers are provided where each fiber has a diameter of less than about 10 microns and comprises a thermoplastic polymer material comprising at least one or a plurality of polyester polymer and at least one or a combination of different meltable metal phosphinates. While a 100% crystalline polyester polymer may theoretically be possible, as a practical matter, some portion of the polymer structure will remain amorphous. Thus, the polyester polymer used in these fibers is semi-crystalline. That is, at least a desired minimum percentage of the polyester polymer is crystalline. The minimum percentage of crystallinity desired will depend upon the particular fiber application.

In another aspect of the present invention, a fibrous structure is provided that comprises a plurality of the melt blown fiber according to the present invention. The fibrous structure can be non-woven, woven, or a combination thereof.

In an additional aspect of the present invention, a fibrous structure is provided that comprises a plurality of melt blown fibers. Each melt blown fiber comprises a thermoplastic polymer material comprising at least one polyester polymer, or a plurality of polyester polymers, and at least one or a combination of different meltable metal phosphinates. The at least one polyester polymer is at least partially crystalline, and the fibrous structure is operatively adapted (e.g., structurally dimensioned, shaped, or otherwise configured or designed) for use in an environment (e.g., adjacent an internal combustion engine, etc.) where the fibrous structure is exposed to temperatures equal to or above the glass transition temperature of the at least one polyester polymer.

In a further aspect of the present invention, a low shrinkage thermoplastic polymer composition is provided that comprises at least one or a plurality of polyester polymers and less than or equal to about 2% by weight of at least one or a combination of different meltable metal phosphinates.

The above and other aspects and advantages of the present invention are further shown and described in the drawings and detailed description of this invention, where like reference numerals are used to represent similar parts. It is to be understood, however, that the drawings and description are for illustration purposes only and should not be read in a manner that would unduly limit the scope of this invention.

The above summary of the present invention is not intended to describe each disclosed embodiment or every implementation of the present invention. The description that follows more particularly exemplifies illustrative embodiments. In a number of places in this application, guidance is provided through lists of examples, which examples can be used in various combinations. In each instance, the recited list serves only as a representative group and should not be interpreted as an exclusive list.

BRIEF DESCRIPTION OF THE DRAWINGS

In the accompanying drawings:

FIG. 1c is an 1800× photomicrograph of a fibrous structure embodiment in accordance with the present invention, where the thermoplastic polymer material of the fibers comprises about 10% by weight of a meltable metal phosphinate;

FIG. 2a is a front view of a fibrous web wound into a roll in accordance with the present invention;

FIG. 2b is a top view of a sheet or mat cut from the fibrous web of FIG. 2a;

FIG. 2c is a 450× photomicrograph of a cross-section of the fibrous web of FIG. 2a;

FIG. 2d is a 450× photomicrograph of the surface of the fibrous web of FIG. 2a.

DETAILED DESCRIPTION OF CERTAIN EMBODIMENTS

Figure 1A:
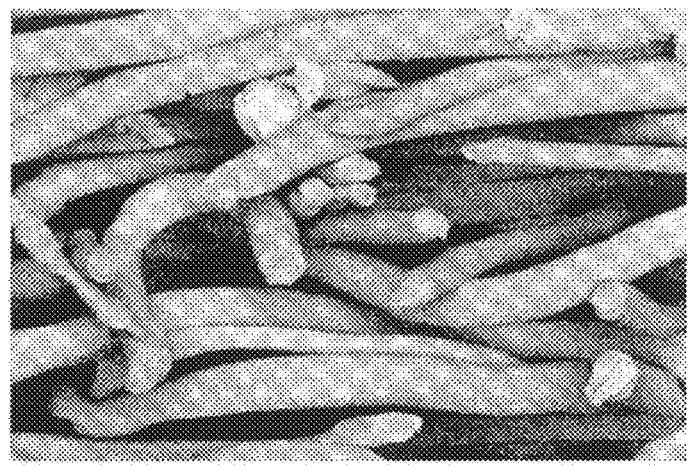
FIG. 1a is an 1800× photomicrograph of a fibrous structure embodiment in accordance with the present invention, where the thermoplastic polymer material of the fibers comprises about 2.5% by weight of a meltable metal phosphinate.

In describing preferred embodiments of the invention, specific terminology is used for the sake of clarity. The invention, however, is not intended to be limited to the specific terms so selected, and each term so selected includes all technical equivalents that operate similarly.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

The term "polymer" will be understood to include polymers, copolymers (e.g., polymers formed using two or more different monomers), oligomers and combinations thereof, as well as polymers, oligomers, or copolymers that can be formed in a miscible blend.

The terms "comprising", "comprises", "including" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably and encompass embodiments having plural referents, unless the content clearly dictates otherwise. Thus, for example, a melt blown fiber that comprises "a" polyester polymer can be interpreted to mean that the fiber includes "one or more" polyester polymers.

The term "and/or" means one or all of the listed elements or a combination of any two or more of the listed elements (e.g., preventing and/or treating an affliction means preventing, treating, or both treating and preventing further afflictions).

As used herein, the term "or" is generally employed in its sense including "and/or" unless the content clearly dictates otherwise.

Also herein, the recitations of numerical ranges by endpoints include all numbers subsumed within that range (e.g., 1 to 5 includes 1, 1.5, 2, 2.75, 3, 3.80, 4, 5, etc.).

In a melt blowing process according to the present invention, a thermoplastic polymer material is provided that comprises at least one or a plurality of polyester polymers (such as, e.g., PET, PBT, PLA and possibly PHB and PTT) and at least one meltable metal phosphinate or a combination of different meltable metal phosphinates. This thermoplastic polymer material is melt blown into a plurality of fibers, with each fiber having a diameter or thickness that is less than about 10 microns.

It can be commercially desirable for the fiber diameter to be less than or equal to about 9, 8, 7, 6 or even 5 microns or less. It can even be commercially desirable for the fiber diameter to be 4, 3, 2 or 1 micron or smaller. The metal phosphinate is present in an amount that reduces the viscosity of the one or more polyester polymers, and possibly other polymers, used so that the thermoplastic polymer material can be melt blown into such size fibers at a temperature of less than or equal to about 370° C., and preferably at a temperature of less than or equal to about 360° C. It can be desirable for the metal phosphinate content to be an amount that allows the thermoplastic polymer material to be melt blown into such size fibers at a temperature of less than or equal to about 350° C., 340° C. 330° C., 320° C., 310° C., or even less than or equal to 300° C. There is also enough metal phosphinate to function as a crystallizing agent that accelerates, induces or at least promotes crystallization of the polyester polymer, when the thermoplastic polymer material is melt blown into the at least one fiber. There is a melt blowing temperature at which a polymeric material will begin to degrade (i.e., their degradation temperature). For example, the onset of PET degradation is about 380° C. Melt blown polymeric fibers can still exhibit problems, when heated to below such a degradation temperature. For example, PET can exhibit problems such as "sand out" when the polymer is melt blown at temperatures above about 350° C.

The melt blowing should be performed within a range of temperatures hot enough to enable the thermoplastic polymer material to be melt blown but not so hot as to cause unacceptable deterioration of the thermoplastic polymer material. For example, the melt blowing can be performed at a temperature that causes the thermoplastic polymer material to reach a temperature in the range of from at least about 290° C. to less than or equal to about 360° C., 350° C., 340° C., 330° C., 320° C., 310° C., or 300° C.

In the melt blowing process, the thermoplastic polymer material is melted to form a molten polymer material. The melt blowing process can include forming (e.g., extruding) the molten polymer material into at least one or a plurality of fiber preforms and solidifying (e.g., cooling) the at least one fiber preform into the at least one fiber. The thermoplastic polymer material can still be molten when the perform is first made. It is desirable for the metal phosphinate to melt at or below the melting point of at least the polyester polymer and function as a crystallization promoter or crystallizing agent that causes at least the polyester polymer phase of the molten polymer material to crystallize before, or at least about the same time as, the molten polymer material solidifies (i.e., as the fiber preform solidifies into the fiber).

The metal phosphinate promotes faster crystallization of the solidifying molten polyester polymer. As a result, the melt blown fiber and a non-woven web of the fibers will exhibit a reduction in heat induced shrinkage. This reduction in shrinkage is especially evident with regard to the length and width dimension of a fiber web made with the fiber. The use of the metal phosphinate may actually improve the mechanical properties of the melt blown fiber, if the metal phosphinate is used in an amount equal to or less than about 10%.

As used herein, a metal phosphinate includes phosphinate metal salt(s). Metal phosphinates may include, e.g., zinc, aluminum and calcium phosphinates, and preferably zinc phosphinates, such as those disclosed in U.S. Pat. Nos. 6,365,071, and 6,255,371; U.S. Patent Publication No. 2004/0176506, which are incorporated herein by reference in their entirety. In addition, depending on the particular polyester polymer used (e.g., PET), a fiber thickness of 10, 9, 8, 7, 6, or 5 microns is equivalent to about 1.0, 0.8, 0.6, 0.5, 0.4, or 0.3 denier, respectively.

In accordance with how it is used in this invention and for at least the polymer composition so far tested, it is believed that the metal phosphinate will only sufficiently reduce the viscosity of the polyester polymer composition (i.e., allow the composition to be melt blown into such small diameter fibers), when about 20% or less of the metal phosphinate is used. It has been found that a melt blown polyester polymer will crystallize to some degree without the metal phosphinate being present, but not fast enough. Without the metal phosphinate, not enough of the polyester polymer crystallizes to prevent significant heat induced shrinkage of the melt blown polyester polymer. While not intending to be bound by theory, it is believed that the metal phosphinate may accelerate, induce or at least promote crystallization of the polyester polymer by causing a more rapid nucleation of the polyester polymer after being melt blown.

The step of providing a thermoplastic polymer material can comprise melt blending of the metal phosphinate with the polyester polymer. The polyester is in polymer form when melt blended with the metal phosphinate. In addition, the step of melt blowing can comprise directly extruding the thermoplastic polymer material through at least one or a plurality of corresponding die openings designed (e.g., dimension and shaped) so as to form the at least one fiber. The melt blown fibers can be formed into a non-woven fiber web by the use of convention techniques. For example, the non-woven fiber web could be formed by allowing the melt blown fibers to self-bond or stick to each other as a result of being still warm from the extrusion process. The melt blown fibers may also be bonded together, to form the non-woven fiber web, by using calender rolls (e.g., while the fibers are still warm and/or after the fibers have cooled down), heated air, adhesive coating(s), mechanical bonding techniques, or any combination thereof.

The thermoplastic polymer material can comprise a blend of a polyester polymer and at least one other polymer to form a polymer blend of two or more polymer phases. It can be desirable for the polyester polymer to be an aliphatic polyester, aromatic polyester or a combination of an aliphatic polyester and aromatic polyester. The thermoplastic polymer material can comprise at least about 0.1, 0.2, 0.3, 0.4, or 0.5 percent by weight of the metal phosphinate. It can be desirable for the thermoplastic polymer material to comprise less than about 20 percent by weight of the metal phosphinate. At concentrations above about 20 percent, the metal phosphinate becomes less effective as a crystallization promoter. Also at such high metal phosphinate concentrations, the viscosity of the melt blended polyester polymer and metal phosphinate will increase, thereby disrupting the ability of the thermoplastic polymer material to be melt blown into fibers. This increase in viscosity can make it impossible, or at least difficult, to melt blow small diameter fibers having a diameter of 10 microns or less.

The polyester polymer can form the only, a majority, or at least a substantial polymer portion or phase of the thermoplastic polymer material. The polyester polymer forms a substantial portion of the thermoplastic polymer material, when the thermoplastic polymer material can be melt blown and the resulting fiber(s) exhibits acceptable mechanical properties and thermal properties. For example, a polyester polymer content of at least about 70% by volume can form a substantial polymer portion or phase of the thermoplastic polymer material. Acceptable mechanical properties or characteristics can include, e.g., tensile strength, initial modulus, thickness, etc. The fiber can be seen as exhibiting acceptable thermal properties, e.g., when a non-woven web made from the fibers exhibits less than about 30, 25, 20 or 15 percent, and preferably less than or equal to about 10 or 5 percent, linear shrinkage when heated to a temperature of about 150° C. for about 4 hours.

After the melt blowing, the polyester polymer phase of the thermoplastic polymer material is completely, mostly, partially, or at least substantially crystalline and the remainder of the polyester polymer is amorphous. As used herein, the polyester polymer phase can be seen as being substantially crystalline, when enough of the polyester polymer crystallizes that a non-woven web made of the melt blown fibers exhibits less than about 30, 25, 20 or 15 percent linear shrinkage, and preferably less than or equal to about 10 or 5 percent linear shrinkage, when heated to a temperature of about 150° C. for about 4 hours. Linear shrinkage is the average of the machine and cross direction web shrinkage.

Not intending to be so limited, it has been found that commercially acceptable properties (e.g., low web shrinkage) can be obtained by providing (a) a thermoplastic polymer material that comprises a minimum of about 70%, and preferably about 80%, by weight of a polyester and (b) for a minimum of about 30%, and preferably about 35%, by mass (as measured by Differential Scanning Calorimetry) of the thermoplastic polymer material forming the fiber to be crystalline. It can be commercially significant for a web made with fibers according to the present invention to exhibit heat induced shrinkage of less than 10%. It is believed that commercially significant fibers, according to the invention, may be obtainable using a thermoplastic polymer material comprising a minimum of at least about 90%, 85%, 80%, 75% or even 70% by weight of a polyester, with varying degrees of crystallinity.

The thermoplastic polymer material of a fiber that is melt blown according to the present invention can exhibit a low molecular orientation and/or different crystal morphology, when compared to a melt-spun or spunbond fiber made with the same thermoplastic polymer material. A melt blown fiber made according to the present invention can exhibit a birefringence of less than or equal to about 0.10, 0.09, 0.08, 0.07, 0.06, 0.05, 0.04, 0.03, 0.02 or 0.01. The birefringence of the fiber is related to the level of polymer molecular orientation present in the fiber. To some extent, birefringence may also be used to measure the degree of crystallization (i.e. volume of crystal structure) in the fiber.

Non-woven and woven fibrous structures (e.g., a scrim, web, mat, sheet, fabric, etc.) can be made according to the present invention by making fibers using a melt blowing process disclosed herein and forming the fibers into a non-woven or woven fibrous structure. The following are descriptions or citations to references that describe different techniques that may be used to form the inventive melt blown microfibers into a non-woven web or other fibrous structure, as well as those that may be used to form the melt blown microfibers into a woven web or other fibrous structure. For example, the concept of meltblowing fibers was first demonstrated by V. A. Wente in "Manufacture of Superfine Organic Fibers.", *U.S. Department of Commerce, Office of Technical Services Report No. PBI* 11437, *Naval Research Laboratory*, Report 4364, 1954, and in "Superfine Thermoplastic Fibers" *Industrial and Engineering Chemistry,* 48: 1342-1346, 1956. Methods of incorporating particulates or fibers, such as staple fibers, bulking fibers or binding fibers, can be used with the method of forming melt-blown microfiber webs disclosed, for example, in U.S. Pat. No. 4,118,531; 4,429,001 or 4,755,178, where particles or fibers are delivered into a single stream of melt-blown fibers. In addition, U.S. Pat. No. 3,971,373 teaches how to incorporate particulates (fibers) into a double stream of meltblown fibers.

A melt blown fiber according to the present invention can have a diameter or thickness that is less than about 10 microns, or less than or equal to about 9, 8, 7 or 6 microns. The melt blown fiber can also comprises a thermoplastic polymer material comprising at least one or a plurality of polyester polymers (such as, e.g., PET, PBT, PLA, and possibly PHB and PTT) and at least one or a combination of different meltable metal phosphinates. The polyester polymer is at least substantially crystalline. That is, at least a substantial amount of the structure of the polyester polymer is in a crystalline form. It may be desirable for the polyester polymer to be at least about 30% by mass crystalline and preferably in the range of from about 30% to about 70%, or in the range of from about 35% to about 65%, crystalline by mass.

The thermoplastic polymer material used to make the present melt blown fibers can comprises a blend of the polyester polymer and at least one other polymer to form a polymer blend. The polyester polymer can be an aliphatic polyester, aromatic polyester or a combination of an aliphatic polyester and aromatic polyester. The polyester polymer forms (a) the only polymer phase or all of the thermoplastic polymer material, (b) a majority of polymer phase or a major portion of the thermoplastic polymer material, or (c) at least a substantial portion of the polymer phase or the thermoplastic polymer material. While all, most, or at least a substantial portion of the polyester polymer phase of the thermoplastic polymer material is crystalline, the remainder of the polyester polymer is amorphous. Enough of the polyester polymer crystallizes that a non-woven web comprising a plurality of the melt blown fibers exhibits less than about 30, 25, 20 or 15 percent, and preferably less than or equal to about 10 or 5 percent, linear shrinkage when heated to a temperature of about 150° C. for about 4 hours.

The thermoplastic polymer material can comprises about 20 percent by weight or less of the metal phosphinate. If more than 20% of the metal phosphinate is used, fiber formation is disrupted, thereby making it difficult to spin the fibers. It can be desirable for the thermoplastic polymer material to comprise at least about 0.1, 0.2, 0.3, 0.4, or 0.5 percent by weight of the metal phosphinate. The metal phosphinate can be a zinc phosphinate.

The melt blown fiber can exhibit a low molecular orientation when compared to a melt-spun or spunbond fiber made with the same polymer material. In addition, the melt blown fiber can exhibit a birefringence of less than or equal to about 0.01. The birefringence of the fiber is related to the level of polymer molecular orientation present in the fiber.

While meltable metal phosphinates are used to impart flame retardant characteristics to polymer materials, a low shrinkage thermoplastic polymer composition according to the present invention can include at least one or a plurality of polyester polymers combined with an amount of at least one or a combination of different meltable metal phosphinates, where the amount of the metal phosphinate(s) would not be enough to make the composition sufficiently flame retardant, for commercial purposes, but the amount is enough so as to accelerate, induce or at least promote crystallization of the polyester polymer(s), when the thermoplastic polymer material is melt blown into a fiber. For example, some such compositions may not exhibit commercially acceptable flame retardant characteristics in an amount of less than or equal to about 2% by weight of at least one or a combination of different meltable metal phosphinates. At the same time, such a low shrinkage thermoplastic polymer composition can comprise a minimum amount of at least one or a combination of different meltable metal phosphinates that would be needed to allow the composition to be melt blown into fibers having a diameter of less than about 10 microns and still be sufficiently crystalline to exhibit low shrinkage at elevated temperature. It has been found that some such compositions can be melt blown into such fibers, if they contained at least about 0.5% by weight of the at least one meltable metal phosphinate. In one exemplary embodiment, fibers having a diameter of less than about 10 microns have been successfully melt blown using compositions having a polymer component that is 100% by weight polyester and at least about 0.5% by weight of the at least one meltable metal phosphinate. It is believed that this amount of meltable metal phosphinate (i.e., about 0.5% by weight) may also be the minimum amount of metal phosphinate needed to melt blow 10 micron diameter fibers, even when the polymer component of the composition contains in the range of from less than 100% by weight polyester to the desired minimum amount of polyester (i.e., about 90%, 85%, 80%, 75%, or even 70% by weight).

Figure 1B:
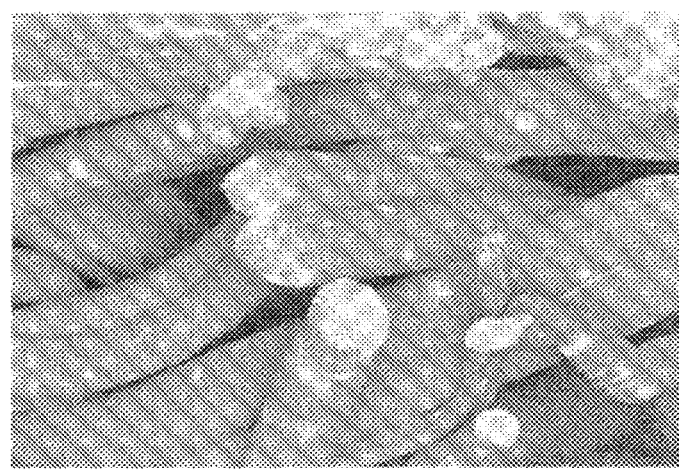
FIG. 1b is an 1800× photomicrograph of a fibrous structure embodiment in accordance with the present invention, where the thermoplastic polymer material of the fibers comprises about 5% by weight of a meltable metal phosphinate.

Referring to FIGS. 1a-1c, melt blown fibers 10 according to the present invention can be in the form of a fibrous structure 12 (e.g., a web, scrim, mat, sheet, fabric, etc.), which can be non-woven, woven or a combination thereof. The thermoplastic polymer material of the fibers 10 of the FIG. 1a embodiment comprises about 2.5% by weight of the zinc diethylphosphinate sold under the name Exolit™ OP 950 and manufactured by Clariant International Ltd., which is located at Rothausstrasse 61, 4132 Muttenz, Switzerland, with the remainder of the fiber composition being the polyethylene terephthalate (PET) type 8416. The thermoplastic polymer material of the fibers 10 of the FIG. 1b embodiment comprises about 5% by weight of the Exolit™ OP 950, with the remainder being the PET type 8416. The thermoplastic polymer material of the fibers 10 of the FIG. 1c embodiment comprises about 10% by weight of the Exolit™ OP 950, with the remainder being the PET type 8416. At 10% loadings and above, the Exolit™ OP 950 tends to cluster up and become difficult to distribute and disperse within the fiber cross-section, as indicated by reference number 14. It has also been shown that higher loadings of the Exolit™ OP 950 (10 wt % and above) may require pre-compounding of the resin with the zinc phosphinate prior to making the fibers.

Figure 2C:
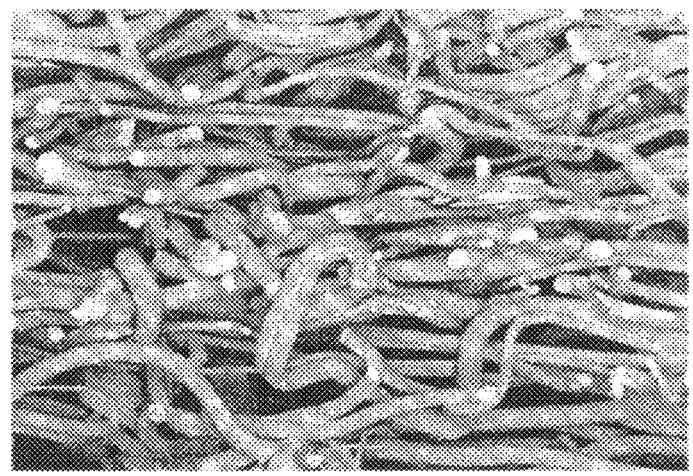
Figure 2D:
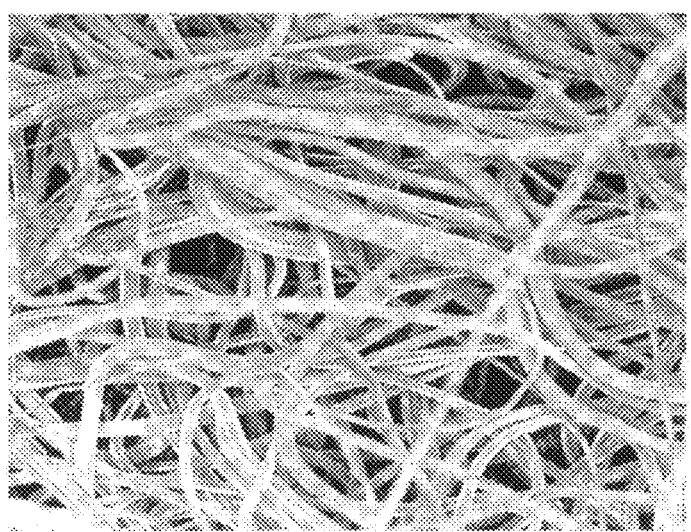

A fibrous structure according to the present invention can further comprise at least one or a plurality of other types of fibers (not shown) such as, for example, staple or otherwise discontinuous fibers, melt spun continuous fibers or a combination thereof. Referring to FIGS. 2a-2d, the present inventive fibrous structures 12 can be formed, for example, into a non-woven web 20 that can be wound about a tube or other core 22 to form a roll 24 (see FIG. 2a) and either stored for subsequent processing or transferred directly to a further processing step. The web 20 may also be cut into individual sheets or mats 24 directly after the web 20 is manufactured or sometime thereafter. The web 20 can be used to make any suitable article 20 such as, for example, thermal and/or sound insulation components for vehicles (e.g., trains, airplanes, automobiles and boats). Other articles such as, for example, bedding, shelters, tents, insulation, insulating articles, liquid and gas filter, wipes, garments and garment components, personal protective equipment, respirators, etc. can also be made using fibrous structures according to the present invention. FIG. 2c shows a cross section of the web 20, and FIG. 2d shows an exposed surface of the web 20.

The following Examples have been selected merely to further illustrate features, advantages, and other details of the invention. It is to be expressly understood, however, that while the Examples serve this purpose, the particular ingredients and amounts used as well as other conditions and details are not to be construed in a manner that would unduly limit the scope of this invention.

TEST METHODS

Mechanical Properties of Melt Blown Fiber Nonwoven Webs

The break force and elastic modulus of the meltblown webs were determined using Instron tensile machine equipped with pneumatic clamps, according to ASTM D5035-06. Five specimens were cut from each web sample in both the machine direction (MD) and cross direction (CD). The thickness of each specimen was measured with a caliper gauge. The dimensions of the specimens were 2.54 cm wide by 15.24 cm long (1 in.×6 in.). A gage length of 7.62 cm (3 inches) and a crosshead testing speed of 30.48 cm/min (12 inches/min.) were used. Values for the break force and modulus for both the machine and cross direction were obtained and averaged for the five replicates (specimens) and are reported in Table 1 below.

TABLE 1

| Example | Break Force (N) MD | Break Force (N) CD | Elastic Modulus (Pa) MD | Elastic Modulus (Pa) CD |
|---|---|---|---|---|
| 1 | 16.6 | 18.3 | $4.2 \times 10^5$ | $6.8 \times 10^4$ |
| 2 | 13.0 | 18.7 | $3.0 \times 10^5$ | $1.8 \times 10^5$ |
| 3 | 23.3 | 19.4 | $3.4 \times 10^5$ | $2.7 \times 10^5$ |
| C1 | 9.3 | 12.4 | $2.4 \times 10^5$ | $1.5 \times 10^4$ |

Flame Retardant Properties of Melt Blown Fiber Nonwoven Webs

The flame retardant characteristics of the meltblown webs were determined using ASTM D6413-08. Ten specimens (76 mm by 300 mm) were cut from each web sample in both the machine direction (MD) and cross direction (CD). Values for char length and after-flame time were determined and are reported in Table 2 below. The ten MD and ten CD specimens were averaged together. Occurrence of any web flaming drips was also reported. After-flame time is defined as the length of the time for which material continues to flame after the ignition source has been removed. Char length is defined as the distance from the material edge directly exposed to the flame to the furthest point of visible material damage after a 100 gram tearing force has been applied.

TABLE 2

| Example | Char Length (mm) | After-flame time (sec) | Flaming Drips (Yes/No) |
|---|---|---|---|
| 1 | 65.2 | 0 | No |
| 2 | 72.2 | 0 | No |
| 3 | 94.6 | 0 | No |
| C1 | 102.4 | 44.5 | Yes |

Field Emission Scanning Electron Microscope (FESEM)

The meltblown webs were imaged and photographed on a Hitachi 54700 field emission scanning electron microscope (FESEM) using low voltage in the ExB compositional mode at magnifications of 250× and 1000×. Cross-sectional specimens of each web were prepared by fracturing each web sample under liquid nitrogen with a new surgical blade. The specimens were then attached to an FESEM stub with carbon conductive tape and compositional images were then taken. ExB images are created using backscattered electrons which are generally more affected by composition, thus areas of higher average atomic number appear brighter in the ExB images. Each specimen was imaged in several areas to obtain representative images of the samples. Representative images are shown in FIGS. 1a, 1b, 1c, 2c and 2d.

Modulated Differential Scanning Calorimetry (MDSC)

Thermal characteristics of the neat type 8396 PET resin and a blend of type 8396 with 2.5 wt % zinc diethylphosphinate (ZDP) were measured using a TA Instruments Q2000 Modulated Differential Scanning calorimeter (MDSC). The test sample was prepared by melting the 8396 PET resin in a Brabender mixer. The molten resin was removed and air cooled at room temperature. A blend of the type 8396 with ZDP was prepared in the same manner except the ZDP was added to the Brabender after the PET was completely melted and then mixed. Specimens were weighed and loaded into TA Instruments $T_{zero}$ aluminum pans. A linear heating rate of 4° C./min. was applied with a perturbation amplitude of ±0.636° C. every 60 seconds. The specimens were subjected to a short hold to dry the specimen followed by a heat (H1)-quench cool (Q)-heat (H2)-slow cool (C2)-heat (H3) profile over a temperature range of 0 to 290° C. The glass transition temperatures were evaluated using the step change in the heat flow (HF) or non-reversing (NR) heat flow curves. The onset, midpoint (half height), and end temperatures of the transition were noted as well as the change in heat capacity observed at the glass transition. Peak integrations were evaluated using the heat flow (HF), reversing (R) heat flow, or non-reversing (NR) heat flow signals. The peak onset temperature, the peak minimum or maximum temperature, and the peak area results were noted. Peak integration results were normalized for sample weight and reported in J/g. The specimen degree of crystallinity was calculated according to the equation:

$$\chi = \frac{\Delta H_{fs}}{\Delta H_{fcr}} \cdot 100\%$$

where $\chi$ is the degree of crystallinity of a material; $\Delta H_{fs}$ is the heat of fusion of a polymer material; $\Delta H_{fcr}$ is the theoretical heat of fusion of a 100% crystalline material. A value of 140 J/g was utilized for evaluating the specimens. Thermal values are reported in Table 3 below. $T_{cc}$ is the cold crystallization peak temperature. $\Delta H_{cc}$ is the area under the cold crystallization peak. $T_m$ is the melting point temperature. $\Delta H_m$ is area under the melting peak. $T_c$ is the crystallization peak temperature (cooling cycle). $\Delta H_c$ is area under the crystallization peak.

TABLE 3

| | 2nd Heat Scan after Quench | | | | | Slow Cool after 2nd Heat Scan | |
|---|---|---|---|---|---|---|---|
| Example | $T_{cc}$ (° C.) | $\Delta H_{cc}$ (J/g) | $T_m$ (° C.) | $\Delta H_m$ (J/g) | $\chi$ (%) | $T_c$ (° C.) | $\Delta H_c$ (J/g) |
| 5 | 125 | 0.6 | 258 | 50 | 35 | 220 | 50 |
| C3 | 139 | 24 | 258 | 45 | 15 | 208 | 46 |

Shrinkage Measurements

The shrinkage properties of the meltblown webs were calculated for each web sample using three 10 cm by 10 cm specimens in both the machine (MD) and cross direction (CD). The dimensions of each specimen was measured before and after their placement in a Fisher Scientific Isotemp Oven at 80° C. for 60 minutes, 150° C. for 60 minutes, and 150° C. for 7 days. Shrinkage for each specimen was calculated in the MD and CD by the following equation:

$$\% \text{ Shrinkage} = \left(\frac{L_0 - L}{L_0}\right) \times 100\%$$

where $L_0$ is the initial specimen length and L is the final specimen length. Average values of shrinkage were calculated and reported in Table 4 below.

TABLE 4

| | 60 minutes at 80° C. | | 60 minutes at 150° C. | | 7 days at 150° C. | |
|---|---|---|---|---|---|---|
| Example | % Shrink (CD) | % Shrink (MD) | % Shrink (CD) | % Shrink (MD) | % Shrink (CD) | % Shrink (MD) |
| 1 | 1.3 | 1.3 | 1.3 | 1.3 | 2.0 | 2.0 |
| 2 | 1.0 | 1.0 | 1.3 | 1.0 | 1.3 | 1.0 |
| 3 | 0.0 | 0.0 | 1.0 | 1.0 | 1.0 | 1.0 |
| C1 | 6.3 | 9.0 | 31.0 | 32.3 | 30.3 | 32.7 |
| 4 | 0.0 | 0.0 | 1.0 | 1.0 | Not Tested | Not Tested |
| C2 | 5.0 | 5.0 | 28.0 | 22.0 | Not Tested | Not Tested |

EXAMPLES

Materials Used

Polyethylene terephthalate (PET) type 8416: commercially available from Invista of Wilmington, Del., melting point of 260° C. and intrinsic viscosity of 0.51 dL/g.

Polyethylene terephthalate (PET) type 8396: commercially available from Invista of Wilmington, Del., melting point of 260° C. and intrinsic viscosity of 0.55 dL/g.

Zinc diethylphosphinate: commercially available under the trade designation EXOLIT™ OP950 from Clariant International of Muttenz, Switzerland, melting point of 220° C., degradation temperature (defined at 2% weight loss) of 380° C. and phosphorous content of approximately 20%.

Example 1

A PET meltblown microfiber web of the present invention was prepared using type 8416 PET resin and EXOLIT™

OP950 additive using the following procedure. A masterbatch of the 8416 PET (97.5 wt %) and EXOLIT™ OP950 additive (2.5 wt %) was prepared using an Ultra Glide 25 mm twin-screw extruder (Krass Maffei Kumstofftechnik-Berstorff, Munich Germany) (co-rotating, with ten zones) using a melt temperature of 280° C. The masterbatch was pelletized using a conventional strand die/water trough/pelletizer apparatus. The masterbatch pellets were then extruded into microfiber webs by a process similar to that described in Wente, Van A., "Superfine Thermoplastic Fibers" in Industrial Engineering Chemistry, Vol. 48, pages 1342 et seq (1956), or in Report No. 4364 of the Naval Research Laboratories, published May 25, 1954 entitled "Manufacture of Superfine Organic Fibers" by Wente, Van. A. Boone, C. D., and Fluharty, E. L. except that a 31 mm (0.75 in.) Brabender conical twin screw extruder was used to feed the molten masterbatch composition to a melt pump (65 rpm) and then to a 25 cm (10 inch) width meltblowing die having orifices (10 orifices/cm) and orifice diameter of 381 microns (0.015 inch). The melt temperature was 290° C., the screw speed was 120 rpm, the die was maintained at 290° C., the primary air temperature and pressure were, respectively, 350° C. and 60 kPa (8.7 psi), the polymer throughput rate was 5.44 Kg/hr. (12 lbs/hr.), and the collector/die distance was 15.2 cm (6 in.). The resulting nonwoven web had an average fiber diameter of 8.9 microns and a basis weight of 149 g/m². The nonwoven web was tested for shrinkage, mechanical and flame retardancy properties as described above and are reported in Tables 1-3 above. A FESEM image of a cross-section of the web is shown in FIG. 1a.

Example 2

A PET meltblown microfiber web was made as in Example 1 above except 5 wt % of zinc diethylphosphinate (ZDP) was compounded into the type 8416 PET resin and the melt pump speed was 70 rpm. The primary air temperature and pressure were, respectively, 350° C. and 48 kPa (7 psi). The resulting nonwoven web had an average fiber diameter of 9.0 microns and a basis weight of 166 g/m². The nonwoven web was tested for shrinkage, mechanical and flame retardancy properties as described above and are reported in Tables 1-3 above. A FESEM image of a cross-section of the web is shown in FIG. 1b.

Example 3

A PET meltblown microfiber web was made as in Example 1 above except 10 wt % of ZDP was compounded into the type 8416 PET resin and the melt pump speed was 50 rpm. The primary air temperature and pressure were, respectively, 350° C. and 62 kPa (9 psi). The resulting nonwoven web had an average fiber diameter of 10.4 microns and a basis weight of 163 g/m². The nonwoven web was tested for shrinkage, mechanical and flame retardancy properties as described above and are reported in Tables 1-3 below. A FESEM image of a cross-section of the web is shown in FIG. 1c.

Example 4

A PET meltblown microfiber web was made as in Example 3 above except type 8396 PET resin was used and a melt temperature of 290° C. was used to prepare the masterbatch pellets. The pellets were extruded into microfiber webs as described in Example 1 above except the primary air temperature and pressure were, respectively, 350° C. and 69 kPa (10 psi). The resulting nonwoven web had an average fiber diameter of 10 microns and a basis weight of approximately 153 g/m². The nonwoven web was tested for shrinkage properties as described above and is reported in Table 4 above.

Example 5

A PET compound for MDSC testing was prepared by using a Brabender mixer and melting the 8396 PET resin at 270° C. and 70 rpm screw speed for 2 minutes. 2.5 wt % of ZDP was added to the Brabender, after the PET was completely melted, and then mixed for an additional two minutes at 70 rpm and at 270° C. The molten blend was removed and air cooled at room temperature. The compound was tested for its thermal properties and the results are reported in Table 3.

Comparative Example C1

As a comparative example a PET meltblown microfiber web was made as in Example 1 above except no ZDP was used. The primary air temperature and pressure were, respectively, 350° C. and 63 kPa (9.1 psi). The resulting nonwoven web had an average fiber diameter of 12.9 microns and a basis weight of 147 g/m². The nonwoven web was tested for shrinkage, mechanical and flame retardancy properties as described above and are reported in Tables 1-3 above.

Comparative Example C2

As a comparative example a PET meltblown microfiber web was made as in Example 4 above except no ZDP was used. The primary air temperature and pressure were, respectively, 350° C. and 63 kPa (9.1 psi). The resulting nonwoven web had an average fiber diameter of 12.9 microns and a basis weight of approximately 148 g/m². The nonwoven web was tested for shrinkage properties as described above and is reported in Table 4 above.

Comparative Example C3

As a comparative example, a PET compound for MDSC testing was prepared by using a Brabender mixer and melting the 8396 PET resin at 270° C. and 70 rpm screw speed for 2 minutes. The molten polymer then was removed and air cooled at room temperature. The polymer was tested for its thermal properties and the results are reported in Table 3.

Table 4 demonstrates that the Example 1-4 fiber webs, which were loaded with zinc diethylphosphinate, showed essentially no shrinkage in comparison to the Comparative Examples C1 and C2, which were 100% PET blown microfiber webs. Also, the ratio of metal phosphinate present in the PET fiber of the web did not affect web shrinkage in general. The 100% PET web described in Comparative Example C2 and made of higher intrinsic viscosity resin (type 8396) had overall lower shrinkage values than the 100% PET web shown in Comparative Example C1. It is theorized that the addition of the metal phosphinate acts as a crystal nucleating agent for the PET, increasing the crystallization rate and perhaps improving its overall crystallinity. To verify this assumption, thermal scans for 100% PET type 8396 original resin and a blend of PET resin with 2.5% zinc diethylphosphinate (Examples C3 and 5, respectively) were collected and the results are shown in Table 3.

EXEMPLARY EMBODIMENTS

Melt Blowing Process Embodiments

1. A process comprising:
    (a) providing a thermoplastic polymer material comprising at least one or a plurality of polyester polymers and at least one or a combination of different meltable metal phosphinates;
    (b) melt blowing the thermoplastic polymer material into at least one fiber or a plurality of fibers; and
    (c) heating the at least one fiber to a temperature equal to or above the glass transition temperature ($T_g$) of the polyester polymer (e.g., a temperature that is at least about 5° C., 10° C., 15° C., 20° C., 25° C., or even 30° C. above the $T_g$),
    wherein the metal phosphinate is in an amount that accelerates, induces or at least promotes crystallization of the polyester polymer, when the thermoplastic polymer material is melt blown into the at least one fiber, and the polyester polymer of the at least one fiber is at least partially crystalline. The $T_g$ of a typical polyester polymer, such as polyethylene terephthalate (PET), is in the range of from about 80° C. to about 90° C.

2. The process according to embodiment 1, wherein the heating of the at least one fiber is to a temperature that is at least about 5° C., 10° C., 15° C., 20° C., 25° C., or even 30° C. above the $T_g$ of the polyester polymer.

3. The process according to embodiment 1 or 2 further comprising:
    disposing the at least one fiber adjacent an internal combustion engine (e.g., under the hood or adjacent the firewall of an automobile, etc.),
    wherein the heating is generated by the internal combustion engine.

4. The process according to embodiment 1 or 2 further comprising:
    manufacturing a textile product comprising the at least one fiber,
    wherein the heating comprises washing and/or drying the textile product.

5. The process according to embodiment 4, wherein the textile product is clothing (e.g., a jacket, coat, gloves, footwear, etc.) or bedding (e.g., a comforter, blanket, sleeping bag, etc.).

6. A process comprising:
    (a) providing a thermoplastic polymer material comprising at least one or a plurality of polyester polymers and at least one or a combination of different meltable metal phosphinates; and
    (b) melt blowing the thermoplastic polymer material into at least one fiber or a plurality of fibers, with each fiber having a diameter or thickness that is less than about 10 microns,
    wherein the metal phosphinate is in an amount that reduces the viscosity of the polyester polymer, and which accelerates, induces or at least promotes crystallization of the polyester polymer, when the thermoplastic polymer material is melt blown into the at least one fiber, and the polyester polymer of the at least one fiber is at least partially crystalline.

7. The process according to embodiment 6, wherein the step of providing a thermoplastic polymer material comprises:
    melt blending of the metal phosphinate with the polyester polymer.

8. The process according to embodiment 7, wherein the step of melt blowing comprises:
    extruding the thermoplastic polymer material through at least one or a plurality of corresponding die openings designed (e.g., dimension and shaped) so as to form the at least one fiber.

9. The process according to any one of embodiments 1 to 8, wherein the thermoplastic polymer material comprises a blend of the polyester polymer and at least one other polymer to form a polymer blend.

10. The process according to any one of embodiments 1 to 9, wherein the polyester polymer is an aliphatic polyester, aromatic polyester or a combination of an aliphatic polyester and aromatic polyester.

11. The process according to any one of embodiments 1 to 10, wherein the thermoplastic polymer material comprises at least about 0.1 percent by weight of the metal phosphinate.

12. The process according to any one of embodiments 1 to 11, wherein the thermoplastic polymer material comprises less than about 20 percent by weight of the metal phosphinate.

13. The process according to any one of embodiments 1 to 12, wherein the metal phosphinate is a zinc phosphinate.

14. The process according to any one of embodiments 1 to 13, wherein the method further comprises melting the thermoplastic polymer material to form a molten polymer material, and the melt blowing comprises:
    forming (e.g., extruding) the molten polymer material into at least one or a plurality of fiber preforms; and
    solidifying (e.g., cooling) the at least one fiber preform into the at least one fiber;
    wherein the polyester polymer has a melting point and the metal phosphinate melts at or below the melting point of at least the polyester polymer and functions as a crystallization promoter or crystallizing agent that causes at least the polyester polymer of the molten polymer material to crystallize before, or at least about the same time as, the molten polymer material solidifies.

15. The process according to any one of embodiments 1 to 14, wherein the melt blowing is performed at a temperature that causes the thermoplastic polymer material to reach a temperature less than or equal to about 360° C.

16. The process according to any one of embodiments 1 to 14, wherein the melt blowing is performed at a temperature that causes the thermoplastic polymer material to reach a temperature in the range of from at least about 290° C. to less than or equal to about 360° C.

17. The process according to any one of embodiments 1 to 16, wherein the polyester polymer forms the only, a majority, or at least a substantial polymer portion, i.e., 90%, 85%, 80%, 75% or even 70% by mass of the thermoplastic polymer material.

18. The process according to any one of embodiments 1 to 17, wherein after the melt blowing, the polyester polymer of the thermoplastic polymer material is completely, mostly, partially, or at least substantially crystalline.

19. The process according to any one of embodiments 1 to 18, wherein enough of the polyester polymer crystallizes that a non-woven web made of the at least one fiber exhibits less than about 30 percent linear shrinkage when heated to a temperature of about 150° C. for about 4 hours.

20. The process according to any one of embodiments 1 to 18, wherein enough of the polyester polymer crystallizes that a non-woven web made of the at least one fiber exhibits less than about 10 percent linear shrinkage when heated to a temperature of about 150° C. for about 4 hours.

21. The process according to any one of embodiments 1 to 20, wherein the polymer material is melt blown into a fiber exhibiting a low molecular orientation when compared to the same size melt-spun or spunbond fiber made with the same polymer material.

22. The process according to any one of embodiments 1 to 21, wherein the at least one fiber exhibits a birefringence of less than or equal to about 0.01.

Method of Making Fibrous Structures Embodiments

23. A method of making a fibrous structure, the method comprising:

making fibers using the process according to any one of embodiments 1 to 22; and forming the fibers into a fibrous structure (e.g., a non-woven web, scrim, mat, sheet, or other structures).

24. The method according to embodiment 23, wherein the fibrous structure is operatively adapted (e.g., structurally dimensioned, shaped, or otherwise configured or designed) for use in an environment (e.g., adjacent an internal combustion engine, etc.) where the fibrous structure is exposed to temperatures equal to or above the $T_g$ of the polyester polymer (e.g., a temperature that is at least about 5° C., 10° C., 15° C., 20° C., 25° C., or even 30° C. above the $T_g$). For example, such a fibrous structure could be cut or otherwise shaped so as to be secured to the underside of a hood for an automobile.

25. The method according to embodiment 23 or 24, wherein enough of the polyester polymer in each melt blown fiber crystallizes such that the fibrous structure exhibits less than about 30 percent linear shrinkage when heated to a temperature of about 150° C. for about 4 hours.

26. The method according to embodiment 23 or 24, wherein enough of the polyester polymer in each melt blown fiber crystallizes such that the fibrous structure exhibits less than about 10 percent linear shrinkage when heated to a temperature of about 150° C. for about 4 hours.

Melt Blown Fiber Embodiments

27. At least one melt blown fiber having a diameter or thickness that is less than about 10 microns and comprising a thermoplastic polymer material comprising at least one or a plurality of polyester polymers and at least one or a combination of different meltable metal phosphinates, wherein the polyester polymer is at least partially crystalline.

28. The melt blown fiber according to embodiment 27, wherein the thermoplastic polymer material comprises a blend of the polyester polymer and at least one other polymer to form a polymer blend.

29. The melt blown fiber according to embodiment 27 or 28, wherein the polyester polymer is an aliphatic polyester, aromatic polyester or a combination of an aliphatic polyester and aromatic polyester.

30. The melt blown fiber according to any one of embodiments 27 to 29, wherein the polyester polymer forms the only, a majority, or at least a substantial polymer portion of the thermoplastic polymer material.

31. The melt blown fiber according to any one of embodiments 27 to 30, wherein most or at least a substantial portion of the polyester polymer of the thermoplastic polymer material is crystalline.

32. The melt blown fiber according to any one of embodiments 27 to 31, wherein enough of the polyester polymer crystallizes that a non-woven web of the at least one melt blown fiber exhibits less than about 30 percent linear shrinkage when heated to a temperature of about 150° C. for about 4 hours.

33. The melt blown fiber according to any one of embodiments 27 to 32, wherein enough of the polyester polymer crystallizes that a non-woven web of the at least one melt blown fiber exhibits less than about 10 percent shrinkage when heated to a temperature of 150° C. for about 4 hours.

34. The melt blown fiber according to any one of embodiments 27 to 33, wherein the thermoplastic polymer material comprises at least about 0.1 percent by weight of the metal phosphinate.

35. The melt blown fiber according to any one of embodiments 27 to 34, wherein the thermoplastic polymer material comprises about 20 percent by weight or less of the metal phosphinate.

36. The melt blown fiber according to any one of embodiments 27 to 35, wherein the metal phosphinate is a zinc diethylphosphinate.

37. The melt blown fiber according to any one of embodiments 27 to 36, wherein the melt blown fiber exhibits a low molecular orientation when compared to the same size melt-spun or spunbond fiber made with the same polymer material.

38. The melt blown fiber according to any one of embodiments 27 to 37, wherein the at least one melt blown fiber exhibits a birefringence of less than or equal to about 0.01.

Fibrous Structure Embodiments

39. A fibrous structure (e.g., that is non-woven or woven) comprising a plurality of the melt blown fiber according to any one of embodiments 27 to 38.

40. A fibrous structure comprising a plurality of melt blown fibers, each melt blown fiber comprising a thermoplastic polymer material comprising at least one polyester polymer, or a plurality of polyester polymers, and at least one or a combination of different meltable metal phosphinates, wherein the at least one polyester polymer is at least partially crystalline, and the fibrous structure is operatively adapted (e.g., structurally dimensioned, shaped, or otherwise configured or designed) for use in an environment (e.g., adjacent an internal combustion engine, etc.) where the fibrous structure is exposed to temperatures equal to or above the $T_g$ of the at least one polyester polymer (e.g., a temperature that is at least about 5° C., 10° C., 15° C., 20° C., 25° C., or even 30° C. above the $T_g$). Such a fibrous structure could be configured, for example, so as to be secured to the underside of a hood for an automobile.

41. The fibrous structure according to embodiment 39 or 40, wherein enough of the at least one polyester polymer in each melt blown fiber crystallizes such that the fibrous structure exhibits less than about 30 percent linear shrinkage when heated to a temperature of about 150° C. for about 4 hours.

42. The fibrous structure according to embodiment 39 or 40, wherein enough of the at least one polyester polymer in each melt blown fiber crystallizes such that the fibrous structure exhibits less than about 10 percent linear shrinkage when heated to a temperature of about 150° C. for about 4 hours.

43. The fibrous structure according to any one of embodiments 39 to 42, wherein the fibrous structure is a non-woven fibrous web.

44. The fibrous structure according to any one of embodiments 39 or 43, further comprising at least one or a plurality of staple or otherwise discontinuous fibers, melt spun continuous fibers or a combination thereof.

Article Embodiments

45. An article comprising a fibrous structure according to any one of the embodiments 39 to 44.

Polymer Composition Embodiments

46. A thermoplastic polymer composition comprising at least one or a plurality of polyester polymers and less than or equal to about 2% by weight of at least one meltable metal phosphinate or a combination of different meltable metal phosphinates.

47. The thermoplastic polymer composition according to embodiment 46, comprising at least about 0.5% by weight of the at least one meltable metal phosphinate. This is the minimum amount of the metal phosphinate needed to melt blow 10 micron diameter fibers, when the composition contains the minimum amount of polyester.

The invention described herein can be used to make halogen free flame retardant polyester melt blown fibrous structures (e.g., fiber webs), and the process used can continuously produce such structures. The distribution and dispersion of the flame retardant additives within the blown fibers prevent flame retardant chemicals from being washed or rubbed off from the fiber and web surfaces. The flame retardant blown micro-fiber webs may be modified to meet different fiber size, weight, density, thickness, loft and functional requirements (e.g., stiffness, resilience, breathability, etc.). In addition to flame retardant properties, blown micro-fiber webs can be modified to have high thermal, moisture and/or dirt resistance; anti-microbial properties; improved filtration properties, etc. Additives other than flame retardants could be added during the extrusion process, released into or coated onto the web or loaded into the web in such forms as fibers or particles. Flame retardant blown micro-fibrous structures may be reprocessed (e.g., shredded) and used in air-laying processes, or carding and cross-lapping processes to make high and medium loft nonwovens.

Fibrous structures of the present invention could be used in a variety of applications including but not limited to insulation and filtration applications. For example, flame retardant or non-flame retardant blown micro-fibrous structures of this invention may be used as thermal insulation for occupational apparel, temporary shelters and bedding. Other applications may also include thermal and/or acoustical insulation in vehicles (e.g., automobiles, buses, trucks, trains, aircrafts, boats, ships, etc.), buildings, appliances, or which otherwise meets applicable construction codes or manufacturer specifications, filter media, etc. Blown microfibrous structures of this invention may become a suitable substitute fiber glass structures (e.g., as insulation in internal combustion engine compartments). Current fiber glass products can be difficult to handle, compared to the same products made with the fibrous structures of the present invention. Flame retardant fibrous structures of this invention may also be a viable substitute for conventional flame retardant type fibrous structures, which are typically expensive and exhibit poor compression resistance and conformability. Such characteristics can be important for fibrous structures used in flame retardant bedding, clothing and temporary shelters.

This invention may take on various modifications and alterations without departing from its spirit and scope. For example only, the present invention could be modified to form fibrous structures that exhibited one or any combination of a low/high loft, low/high density, and low/high basis weight. Additives could also be added during extrusion of the melt blown fibers or post-processing of the melt blown fibers and/or webs to make products which are: anti-microbial, moisture resistant, etc. In addition, the melt blown fibrous structures of the current invention could be further re-processed into nonwoven media through the use of air-laying processes. Accordingly, this invention is not limited to the above description but is to be controlled by the limitations set forth in the following claims and any equivalents thereof.

This invention may be suitably practiced in the absence of any element not specifically disclosed herein.

All patents and patent applications cited above, including those in the Background section, are incorporated by reference into this document in total.

What is claimed is:

1. A process comprising:
    (a) providing a thermoplastic polymer material comprising at least one or a plurality of polyester polymers and at least one or a combination of different meltable metal phosphinates;
    (b) melt blowing the thermoplastic polymer material into at least one fiber; and
    (c) heating the at least one fiber to a temperature equal to or above the glass transition temperature ($T_g$) of the polyester polymer,
    wherein the metal phosphinate is in an amount that at least promotes crystallization of the polyester polymer, when the thermoplastic polymer material is melt blown into the at least one fiber, and the polyester polymer of the at least one fiber is at least partially crystalline.

2. The process according to claim 1 further comprising: disposing the at least one fiber adjacent an internal combustion engine,
    wherein said heating is generated by the internal combustion engine.

3. The process according to claim 1 further comprising: manufacturing a textile product comprising the at least one fiber,
    wherein the heating comprises washing and/or drying the textile product.

4. A process comprising:
    (a) providing a thermoplastic polymer material comprising at least one polyester polymer and at least one meltable metal phosphinate; and
    (b) melt blowing the thermoplastic polymer material into at least one fiber having a diameter less than about 10 microns,
    wherein the metal phosphinate reduces the viscosity of the polyester polymer and at least promotes crystallization of the polyester polymer, when the thermoplastic polymer material is melt blown into the at least one fiber, and the polyester polymer of the at least one fiber is at least partially crystalline.

5. The process according to claim 1, wherein the thermoplastic polymer material comprises in the range of from at least about 0.1 percent by weight of the metal phosphinate up to less than about 20 percent by weight of the metal phosphinate.

6. The process according to claim 1, wherein said melt blowing is performed at a temperature that causes the thermoplastic polymer material to reach a temperature of less than or equal to about 360° C.

7. The process according to claim 1, wherein the polymer material is melt blown into a fiber exhibiting a low molecular orientation when compared to the same size melt-spun or spunbond fiber made with the same polymer material.

8. A method of making a fibrous structure, said method comprising:
    making fibers using the melt blowing process according to claim 1; and
    forming the fibers into a fibrous structure.

9. The method according to claim 8, wherein the fibrous structure is operatively adapted for use in an environment where the fibrous structure is exposed to temperatures equal to or above the $T_g$ of the polyester polymer.

10. The method according to claim 8, wherein enough of the polyester polymer in the fibers crystallizes such that the fibrous structure exhibits less than about 30 percent linear shrinkage when heated to a temperature of about 150° C. for about 4 hours.

11. The process according to claim 1, wherein the at least one fiber exhibits a low molecular orientation when compared to a melt-spun or spunbond fiber made with the same polymer material.

12. The process according to claim 1, wherein the at least one fiber exhibits a birefringence of less than or equal to about 0.01.

13. The method according to claim 8, wherein enough of the polyester polymer in the fibers crystallizes such that the fibrous structure exhibits less than about 10 percent linear shrinkage when heated to a temperature of about 150° C. for about 4 hours.

14. The process according to claim 1, wherein the thermoplastic polymer material comprises less than or equal to about 2% by weight of at least one meltable metal phosphinate.

15. The process according to claim 1, further comprising melting the thermoplastic polymer material to form a molten polymer material, and said melt blowing comprises:
    forming the molten polymer material into at least one fiber preform; and
    solidifying the at least one fiber preform into the at least one fiber;
    wherein the polyester polymer has a melting point and the metal phosphinate melts at or below the melting point of at least the polyester polymer and functions to cause at least the polyester polymer of the molten polymer material to crystallize before, or at least the same time as, the molten polymer material solidifies.

16. The process according to claim 15, wherein the at least one fiber has a diameter less than about 10 microns.

17. The process according to claim 1, wherein the at least one fiber has a diameter less than about 10 microns.

* * * * *